US011681933B2

(12) United States Patent
Herz et al.

(10) Patent No.: US 11,681,933 B2
(45) Date of Patent: Jun. 20, 2023

(54) CONSUMER INTELLIGENCE FOR AUTOMATIC REAL TIME MESSAGE DECISIONS AND SELECTION

(71) Applicant: Warner Bros. Entertainment Inc., Burbank, CA (US)

(72) Inventors: Justin Herz, Los Angeles, CA (US); Brian Kursar, Los Angeles, CA (US); Keith Camoosa, Los Angeles, CA (US); Gregory Gewickey, Carpinteria, CA (US); Lewis Ostrover, Los Angeles, CA (US); Adam Husein, Los Angeles, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 467 days.

(21) Appl. No.: 16/824,692

(22) Filed: Mar. 19, 2020

(65) Prior Publication Data
US 2020/0320410 A1 Oct. 8, 2020

Related U.S. Application Data

(63) Continuation of application No. PCT/US2018/051597, filed on Sep. 18, 2018.
(Continued)

(51) Int. Cl.
*G06N 5/04* (2023.01)
*G06F 16/28* (2019.01)
(Continued)

(52) U.S. Cl.
CPC ............ *G06N 5/04* (2013.01); *G06F 16/284* (2019.01); *G06N 20/00* (2019.01); *G06Q 20/202* (2013.01);
(Continued)

(58) Field of Classification Search
CPC ........ G06N 5/04; G06N 20/00; G06F 16/284; G06Q 20/202; G06Q 30/0201; G06Q 30/0202; G06Q 30/0203; G06Q 30/0244; G06Q 30/0246; G06Q 30/0255; H04L 51/046
See application file for complete search history.

(56) References Cited

U.S. PATENT DOCUMENTS 9,230,212 B2 * 1/2016 Su .......................... G06N 5/02
10,129,211 B2 * 11/2018 Heath .................... G06Q 30/02
(Continued)

OTHER PUBLICATIONS

Shankar, 2010, Elsevier sections pp. 55-57.*
WO, PCT/US2018/051597 ISR and Written Opinion, dated Dec. 20, 2018.

*Primary Examiner* — Michael Ezewoko
(74) *Attorney, Agent, or Firm* — One LLP

(57) ABSTRACT

Methods and apparatus for improving automatic selection and timing of messages by a machine or system of machines include an inductive computational process driven by log-level network data from mobile devices and other network-connected devices, optionally in addition to traditional application-level data from cookies or the like. The methods and apparatus may be used, for example, to improve or optimize effectiveness of automatically-generated electronic communications with consumers and potential consumers for achieving a specified target.

21 Claims, 8 Drawing Sheets

Related U.S. Application Data

(60) Provisional application No. 62/560,637, filed on Sep. 19, 2017.

(51) Int. Cl.
| | |
|---|---|
| *G06N 20/00* | (2019.01) |
| *G06Q 20/20* | (2012.01) |
| *G06Q 30/0201* | (2023.01) |
| *G06Q 30/0203* | (2023.01) |
| *G06Q 30/0242* | (2023.01) |
| *G06Q 30/0251* | (2023.01) |
| *H04L 51/046* | (2022.01) |
| *G06Q 30/0202* | (2023.01) |

(52) U.S. Cl.
CPC ..... *G06Q 30/0201* (2013.01); *G06Q 30/0202* (2013.01); *G06Q 30/0203* (2013.01); *G06Q 30/0244* (2013.01); *G06Q 30/0246* (2013.01); *G06Q 30/0255* (2013.01); *H04L 51/046* (2013.01)

(56) References Cited

U.S. PATENT DOCUMENTS

| | | | |
|---|---|---|---|
| 10,158,898 B2 * | 12/2018 | Harvey | H04N 21/25891 |
| 10,506,055 B2 * | 12/2019 | Foged | H04L 51/224 |
| 10,558,987 B2 * | 2/2020 | Theocharous | G06Q 30/0202 |
| 2016/0055498 A1 | 2/2016 | Wang et al. | |
| 2016/0210661 A1 * | 7/2016 | Chittilappilly | G06Q 30/0249 |
| 2017/0061367 A1 | 3/2017 | Zhang et al. | |
| 2019/0068719 A1 * | 2/2019 | Schmidli | G06F 9/542 |

\* cited by examiner

CONSUMER INTELLIGENCE FOR AUTOMATIC REAL TIME MESSAGE DECISIONS AND SELECTION

This application in a continuation of International (PCT) Application No. PCT/US2018/051597 filed Sep. 18, 2018, which claims priority pursuant to 35 U.S.C. § 119(e) to U.S. Provisional Patent Application Ser. No. 62/560,637 filed Sep. 19, 2017, which applications are hereby incorporated by reference in their entireties.

FIELD

The present disclosure relates to methods and apparatus for improving automatic selection and timing of messages by a machine or system of machines using an inductive computational process driven by log-level network data from mobile devices and similar network-connected devices.

BACKGROUND

Consumers are inundated with commercial and non-commercial messages received through different messaging platforms and devices. It is easier than ever to send someone a message, but harder than ever to get the recipient's attention. Accordingly, automated methods for selecting consumer messaging have been implemented, with varying results.

Prior approaches to automated selection focus on consumer interest monitoring, to develop interest information about consumers (e.g., websites they have visited, or items they have considered purchasing). Technologies for tracking, recording and exploiting consumer interest include reading and writing cookies to client devices, tracking consumer use of search engines, and other methods. Sources of consumer interest information into consumer ratings, purchase histories, and extent or quality of consumer electronic promotional platforms, whether site-based or message-based.

Interest information is useful for tailoring messages to individual interests or common interests for a cohort of individuals. Interest information can also be aggregated and used for "top-down" estimates of campaign success. However, top-down estimates are often rendered inaccurate by unanticipated external variables, such as news events or weather events. These events can similarly render planned messaging campaign ineffective. Other limitations include difficulty in identifying potential consumers who may be interested in a product, but have not expressed a preference through any channel, and lack of information about the most advantageous message format, medium, and time.

It would be desirable, therefore, to develop new methods for improving automatic selection and timing of messages by a machine or system of machines, that overcome these and other limitations of the prior art and enhance the value of messaging for senders and receivers.

SUMMARY

This summary and the following detailed description are complementary parts of an integrated disclosure and may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as will be apparent from the respective disclosures.

A method and apparatus for improving automatic selection and timing of messages by a machine or system of machines includes real-time selection of content, content format or platform, and consumer messaging based on an artificial intelligence engine that correlates log level data to consumer behavior. A computer-implemented method may include identifying short-term and long-term hidden correlations between sample log-level activity collected from Internet of Things (IoT), mobile devices, point-of-sale (PoS), personal computer (PC) and other available log data using machine learning. The method may include selecting a message for a consumer based on correlations discovered by machine learning applied to real-time or near-real time log-level data for a user, client device, or cohort of users or client devices. For example, a server system processes on-the-fly (dynamic) selection entertainment content and consumption model for presentation based on short-term log level data, data from automatic content recognition, and from data management platforms. The system can use device activity, time, and device activity patterns to choose content for offers and making other messaging choices. The system can use location as a proxy for interest or activity indication, including use of beacons or other locating signals, and estimation of user activity or position as well as location. In economic modeling, the systems tracks and predicts the influence of newsworthy events to assist planning and adjusting marketing campaigns. In embodiments, the use of consumer intelligence enables frictionless transactions in the context of independent point-of-sale activity.

In an aspect of the disclosure, a computer-implemented method for deriving a predictive engine for improving automatic selection and timing of messages by a machine or system of machines includes accessing, by one or more hardware processors, a set of sample log-level input data derived from multiple client devices (e.g., IoT, mobile, PC, and PoS devices). The method may further include accessing, by the one or more hardware processors, a set of sample output data indicative of different consumer responses to a set of messages wherein each message is characterized by a parameter set. The method may further include accessing, by one or more hardware processors, a data structure that defines correlations between individual records of the sample log-level input data and the sample output data based on personal identifiers, personal characteristics, client device identifiers, client device characteristics or any combination of the foregoing identifiers and characteristics. The method may further include applying, by one or more hardware processors, a machine learning process encoded in a computer language to the sample log-level input data, the sample output data, and the correlations, thereby deriving a computer-coded predictive engine that assigns a likelihood of a defined consumer response to any message characterized by the parameter set based on log-level input data and the correlations. In addition, the method may further include saving, by one or more hardware processors, the computer-coded predictive engine in a computer memory for use in selecting messages characterized by the parameter set based on log-level input data correlated to any one or more of the personal identifiers, personal characteristics, client device identifiers, and client device characteristics. The method for deriving the predictive engine may include further operations and aspects as more fully described in the detailed description below.

In another aspect, a computer-implemented method for automatic selection of electronic messages for delivery to client devices may include accessing, by one or more hardware processors, a subset of log-level input data derived from multiple network nodes. The processor may define (e.g., recognize) the subset of the input data by existence of at least one correlation between a data item and one or more of a personal identifier, a personal characteristic, a client device identifier, or a client device characteristic. The method may further include accessing, by the one or more hardware processors, a set of messages wherein each message is characterized by a parameter set. The method may further include applying, by the one or more hardware processors, a computer-executable predictive engine to the subset of log-level input data, thereby determining a likelihood of a defined consumer response to any message characterized by the parameter set. The method may further include selecting, by the one or more hardware processors, one of the messages based on the likelihood of the defined consumer response for ones of the messages. The method may further include sending, by the one or more hardware processors, the selected one of the messages to a client device correlated to the subset of the log-level input data. The method for automatic selection of messages may include further operations and aspects as more fully described in the detailed description below.

Any of the foregoing methods may be implemented in any suitable programmable computing apparatus, by provided program instructions in a non-transitory computer-readable medium that, when executed by a computer processor, cause the apparatus to perform the described operations. An apparatus may include a computer or system of computers coupled to an electronic communication network for electronic messaging or other electronic communication with client devices. In other embodiments, an apparatus may include a computer or system of computers coupled to a data center of an electronic communication network for caching real-time log-level data received from client devices using the network, and for storing client device and user profile data.

To the accomplishment of the foregoing and related ends, one or more examples describe and enable features pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
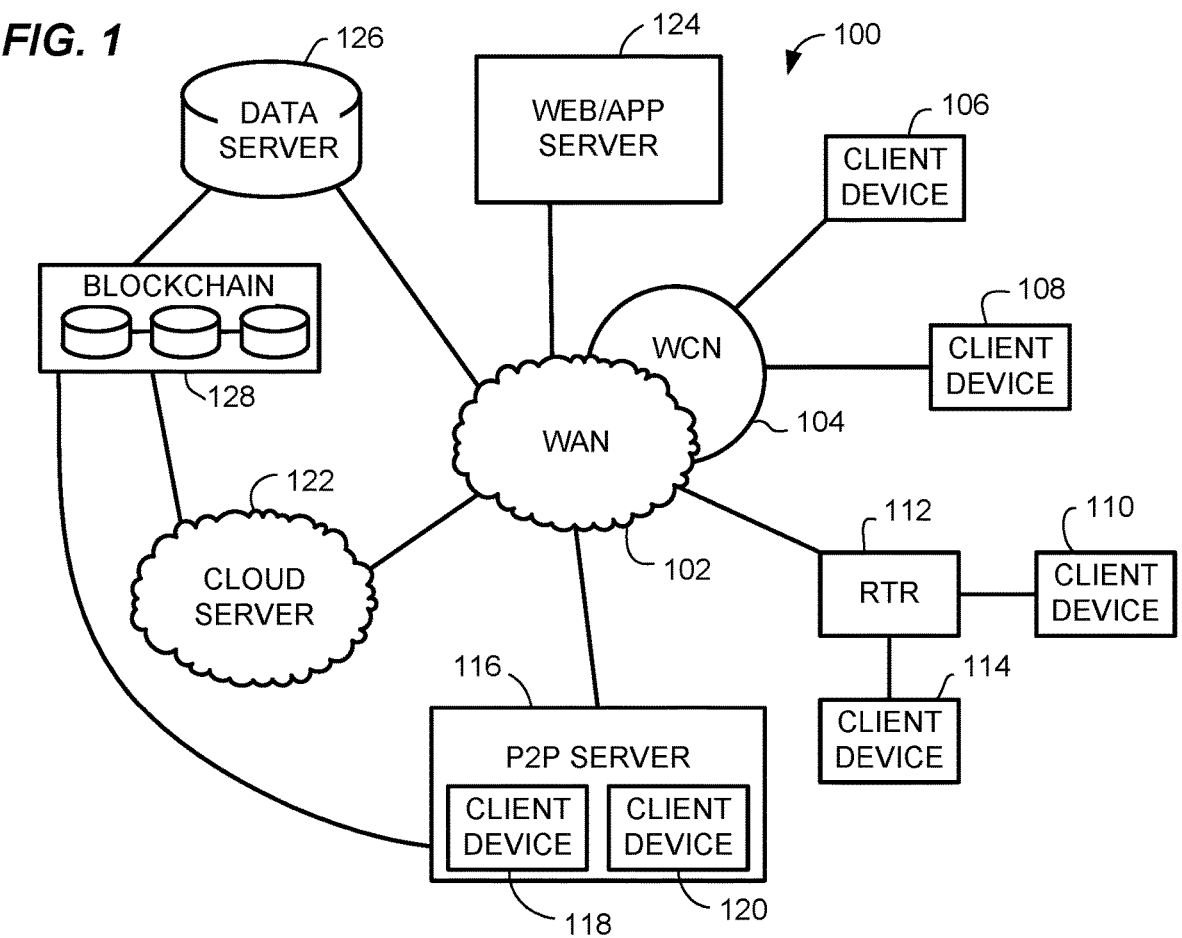
FIG. 1 is a block diagram showing a client-server environment in which the methods and apparatus described herein may be used.

Referring to FIG. 1, a client-server environment 100 for use with the methods and apparatus described herein may include various computer servers and client entities in communication via one or more networks, for example a Wide Area Network (WAN) 102 (e.g., the Internet) and/or a wireless communication network (WCN) 104, for example a cellular telephone network. Computer servers may be implemented in various architectures. For example, the environment 100 may include one or more Web/application servers 124 containing documents and application code compatible with World Wide Web protocols, including but not limited to HTML, XML, PHP and JavaScript documents or executable scripts, for example. The environment 100 may include one or more data servers 126 for holding data, for example video, audio-video, audio, and graphical content for consumption using a client device, software for execution on or in conjunction with client devices for example games and applications for any purpose, and data collected from users or client devices. Data collected from client devices or users may include, for example, log level data and application data. As used herein, "log level data" means time-correlated data indicating a machine state or action for a client device. Log-level data may be collected by a background (not user-facing) application operating on the client device, and transmitted to a data sink, for example, a cloud-based data server 122 or discrete data server 126. Application data means application state data, including but not limited to records of user interactions with an application or other application inputs, outputs or internal states. Applications and data may be served from other types of servers, for example, any server accessing a distributed blockchain data structure 128, or a peer-to-peer (P2P) server 116 such as may be provided by a set of client devices 118, 120 operating contemporaneously as micro-servers or clients.

The environment 100 may include various client devices, for example a mobile smart phone client 106 and notepad client 108 connecting to servers via the WCN 104 and WAN 102; any one of the foregoing client devices, or a personal computer client device 110, a mixed reality (e.g., virtual reality or augmented reality) client device 114, a Point-of-Sale (PoS) device, a social robot; an audio-only terminal, or smart "Internet of Things" (IoT) appliance connecting to servers via a router 112 and the WAN 102. In general, client devices may be, or may include, computers used by users to access data or applications provided via a server.

Figure 2:
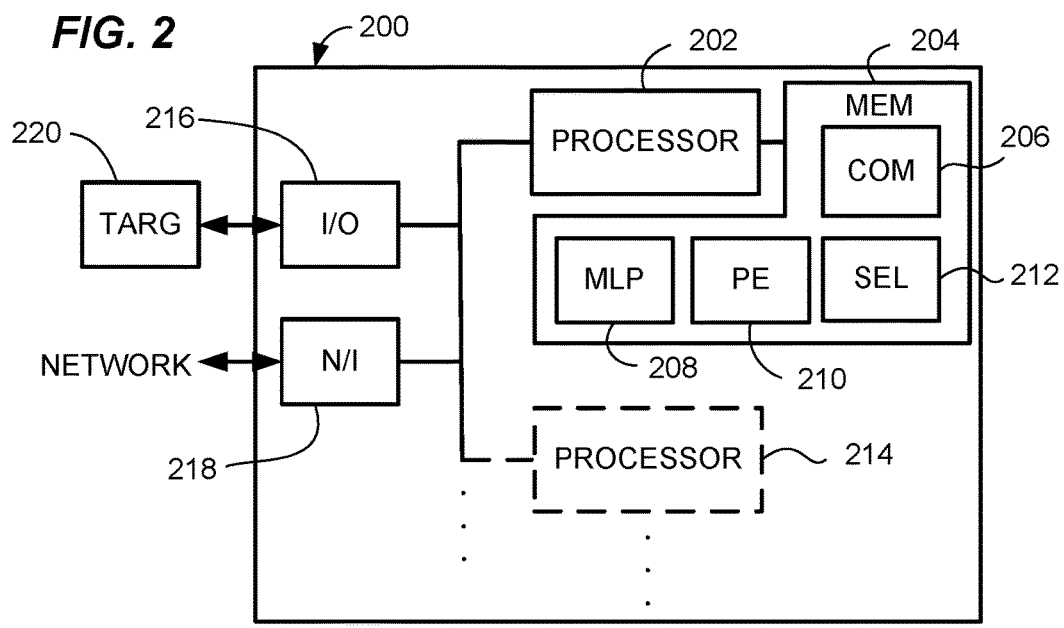
FIG. 2 is a block diagram of a computer server for improving automatic selection and timing of messages.

FIG. 2 shows a generic computer server 200 for improving automatic selection and timing of messages to client devices, which may be used in the environment 100. The server 200 may include one or more hardware processors 202, 214 (two of one or more shown). Hardware includes firmware. Each of the one or more processors 202, 214 may be coupled to an input/output port 216 (for example, a Universal Serial Bus port or other serial or parallel port) to a source 220 for a defined messaging target 216. A messaging target may comprise a quantifiable objective for a messaging campaign, for example, a retention period, a frequency of use over a defined period, an amount or frequency of sales, a click-through percentage, an average engagement period, or any other purpose for a messaging campaign or process that an operator desires so long as achievement of the purpose is measurable. It should be appreciated that some types of servers, e.g., cloud servers, sever farms, or P2P servers, may include multiple instances of discrete servers 200 that cooperate to perform functions of a single server.

The server 200 may include a network interface 218 for sending and receiving applications and data, including but not limited to log-level and application data used for predicting effectiveness of message selection, and messages selected thereby.

Each processor 202, 214 of the server 200 may be operatively coupled to at least one memory 204 holding functional modules 206, 208, 210, 212 of an application or applications for performing a method as described herein. The modules may include, for example, a communication module 206 for communicating with client devices and servers. The communication module 206 may include instructions that when executed by the processor 202 and/or 214 cause the server to perform one or more of: deriving sample or real-time log-level input data from multiple client devices, accessing a data structure of sample or real-time log-level input data derived from the multiple client devices, and/or accessing a data structure that defines correlations between individual records of the sample or real-time log-level input data and the sample or real-time output data based on personal identifiers, personal characteristics, client device identifiers, client device characteristics or any combination of the foregoing identifiers and characteristics.

The modules may include, for example, a machine learning process (MLP) module 210. The MLP module 206 may include instructions that when executed by the processor 202 and/or 214 cause the server to perform one or more of applying a machine learning process encoded in a computer language to the sample log-level input data, the sample output data, and the correlations accessed by the communications module 206. The machine learning process develops a predictive engine 210 that when executed by the processor causes the server to assign a likelihood of a targeted outcome, e.g., a defined consumer response to any message characterized by the parameter set, based on log-level input data and the correlations. The modules may further include a selection module 212 that when executed by the processor causes the server to select a message characterized by the parameter set from a set of predetermined messages, based on log-level input data correlated to any one or more of the personal identifiers, personal characteristics, client device identifiers, and client device characteristics. The memory 204 may contain additional instructions, for example an operating system, and supporting modules. The communications module 206, or a different module, may be used to send the selected message to a selected client device or set of devices.

Figure 3:
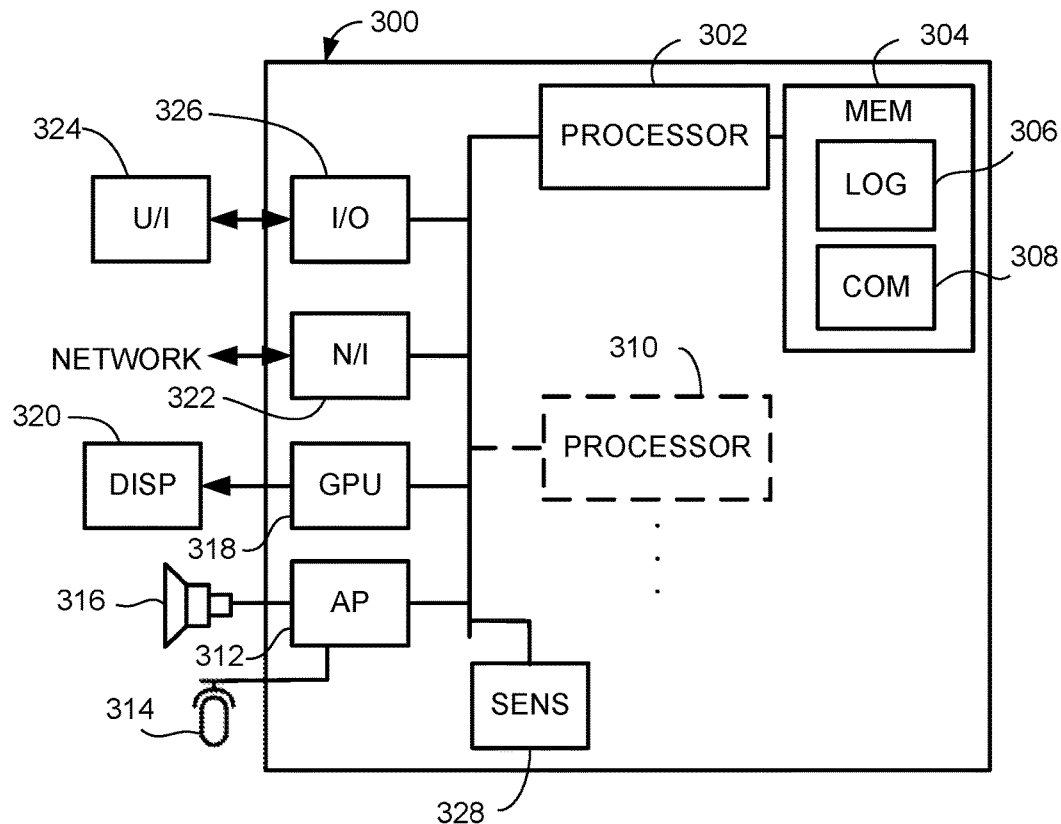
FIG. 3 is a block diagram of a client device suitable for interacting with a server for improving automatic selection and timing of messages.

FIG. 3 is a block diagram of a client device 300 suitable for interacting with a server (e.g., the server 200 described above) for improving automatic selection and timing of messages from the server to the client 300. The client device 200 may be, or may include, any one of the examples described above in connection with the client-server environment 100. The client device 300 may include, a single hardware or firmware processor 302 coupled to a memory 304 holding one or more functional modules 306, 308. In an alternative, the client device 300 may include multiple parallel processors 302, 310. Each processor is coupled to essential components of the client device 300, including at least the memory 304 holding functional components including at least a data logging component 306 and a client-server communication component 308.

The client device 300 may further include one or more input/output ports (e.g., USB or other serial port) each coupled to a user input device. A user input device may include, for example, a touchscreen interface, a keyboard or keypad, a pointing device (e.g., a computer mouse), an eye position sensor for a mixed reality client, a microphone (e.g., the depicted microphone 314), or other pointing device. It should be appreciated that user input devices may be coupled to the processor 302 or processor 310 via a non-serial interface, for example, a touchscreen may be coupled via a graphic processing unit 318 and a microphone 314 may be coupled via an audio processing unit 312. The user input devices convert physical actions by a user into an electrical signal that can be interpreted by a processor of the client 300 as a command or as data. Semantic meaning for the electrical signals may be supplied by any suitable user interface application, for example, a graphical user interface (GUI) application that generates a GUI for display by a display device 320, or an audible interface application that interprets speech or other audible signals pick up by the microphone 314. Semantic meaning may also be inferred from lower-level components, for example, operating systems and device drivers.

The client device 300 may further include one or more network interfaces 322 (e.g., an Ethernet, or wireless network interface controller (WNIC)) for communicating with servers or other nodes of an external network. The client device 300 may further include one or more graphic processing units 318 for supplying a video signal to a display device 320. A display device may include, for example, a computer monitor or television, a digital projector, a mobile device display, or a dedicated mixed reality display. The client device 300 may further include one or more audio processors 312 for driving, based on digital input from the processor 302 and/or 310, an audio output transducer 316 that generates audio (e.g., speech, music, or sound effects) for hearing by a user of the client device 300. An audio processor 312 may be configured to receive an audio signal 314 picked up by a microphone 314 and convert it to a digital signal for processing by the processor 301 and/or 310. The processor may use the digital audio input to discern spoken commands from a user of the client device 300, to detect or record ambient sounds for logging, or other use. In some embodiments, the client device 300 may lack any capabilities for graphical output and may interact with the user solely or primarily via an audio user interface.

In an aspect, the client device 300 may further include one or more sensors 328 in addition to the microphone 314 that generate digital data indicative of a physical state or environment of the client device. The one or more sensors 328 are coupled to the processor 302 and/or 310 and supply digital data that the processor or processors use to generate log-level data using a logging module 306. For example, the processor 302 may receive sensor signals from the microphone 316, process the data by an algorithm or algorithms, and generate one or more processed data objects from the data. Processed data objects may be numeric, textual, and/or otherwise symbolic, and recorded in a computer-readable symbol set, e.g., binary code or standard character set (e.g., ASCII, MAC OS, etc.). Processed data objects from sound may include, for example: a numeric ambient sound level, a sound type (e.g., speech, music, ambient office, ambient urban, ambient rural), sound frequency, sound amplitude, language of speech, number of speech or sound sources detected, and direction or speech or sound sources. For further example, the processor 302 may receive signals from a location, acceleration and/or orientation sensor, and generate one or more processed data objects from the location or orientation signals. Processed data objects from location or orientation data may include, for example, latitude and longitude, device orientation relative to an Earth frame of reference, linear velocity, linear acceleration, angular velocity, shock, and angular acceleration. For further example, the processor 302 may receive signals from an optical sensor and generate one or more processed data objects from the optical sensor signals. Processed data objects from optical signals may include, for example, an ambient light level, a rate of change in light level, a color temperature or hue, and rates in change of color temperature or hue. Other sensors may include a user input device, for example, a touchscreen or keypad. The processor may receive signals from user input devices 324 and generate one or more processed data objects from the user input device signals. Processed data objects from user interface signals may include, for example, touch event, frequency of touch events, and touch pressure. The processors 302 and/or 310 may log each of the foregoing processed data objects in the memory 304 and/or send to another data sink correlated to a time of day, day of the week, and/or date that the sensor data was received, based on an internal client clock (not shown) and/or a time signal received from a network node.

In an aspect, the memory 300 may further hold a communications module 308 that manages communications between the client device and one or more servers that perform functions as described herein. The communications module 308 uploads or otherwise provides logged data to one or more data servers. The module may cause log-level data to be provided to the server in batch mode (e.g., at times when the client device is idle), or in real-time mode (e.g., as quickly as possible after generated by the client device 300), or in some combination of batch and real-time modes. For example, the logging module 306 may flag data as short-term or long-term, with short-term data uploaded to a system server in real-time mode and long-term data uploaded in batch mode. In addition, the communications module 308 may receive messages from a system server that have been selected using a machine-learning message selection process or apparatus as described herein.

In another aspect, the memory 300 may hold one or more end user applications, or components thereof. The end user applications may include, for example, a video game, a social networking application, a web browser, a mobile communications application, or a library manager. The logging module 306 may receive data or signals the one or more end user applications and generate one or more processed data objects based on the data or signals. Processed data objects from application signals or data may be referred to herein as "application level data." Application level data may include, for example, states of application variables. In addition, application level data may be generated by system servers when the application is executed at least partly by one or more of such servers.

Figure 4:
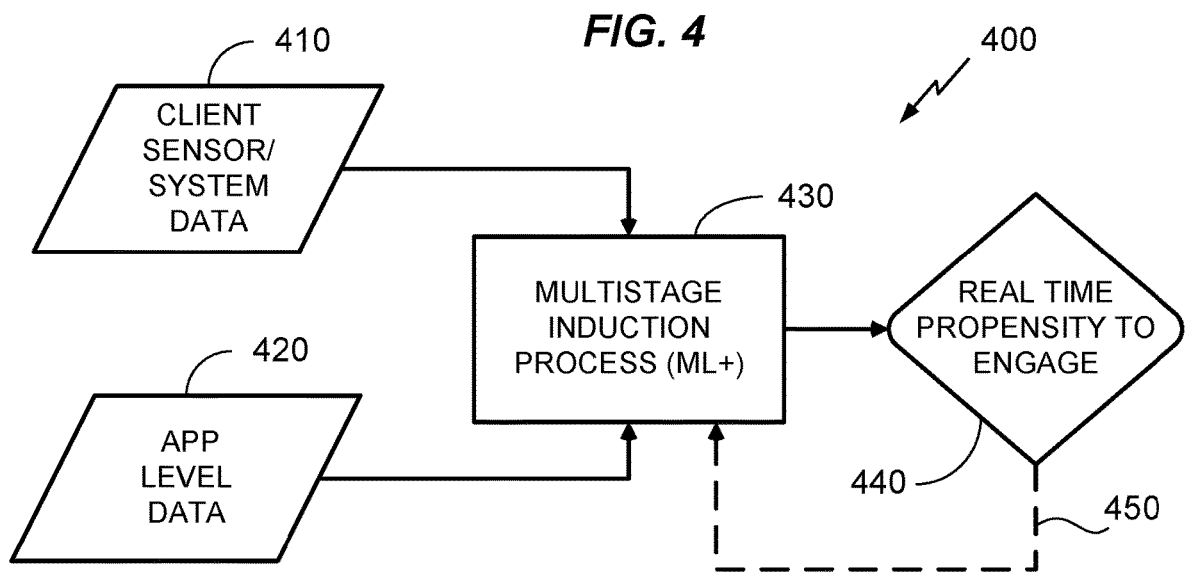
FIG. 4 is a high-level function diagram of a process or apparatus for developing a predictive engine useful for automatic selection of electronic messages for delivery to client devices.

Log-level and application level data may be used as input to a high-level function 400 that derives a predictive correlation between a set of input data and a desired messaging target 440, as diagrammed in FIG. 4. The function 400 may be performed by a system server. More specifically, for example, the function 400 may be performed the machine learning module 208 of server 200 during a training process using sample data to derive an initial prediction engine module 210. The server may execute a separate instance of the function 400 for each different desired target 440, which in the illustrated example is described as "real time propensity to engage." Likewise, a separate instance of the induction process 430 may be executed for training sets of different scope. In an aspect, the scope of the training set should match the scope of the log-level and application level data expected in real time. For example, if real time data consisting of 50 specific record types of log-level data and 100 specific record types of application level data are anticipated, then the training set should consist of those same 50 and 100 record types. In addition, different machine learning algorithms may be used in different instances of the function 400, depending on the type of input data and desired target.

During the initial or a subsequent training process, the machine learning process 430 receives feedback 450 from a measurement function that compares an actual result (e.g., achievement of a minimum 3-day retention period) with observed results. The MLP 430 adjusts its internal parameters to minimize error between predicted and observed results.

Once the process 400 is trained on a sample set, it is ready to be used by a system server for a real-time prediction engine (e.g., in a prediction engine module 210) for the target for which trained. In real-time mode, the training set is replaced by real-time data, which may of the same record types as the training set. Using the real-time data as input, the induction process 430 estimates a likelihood that a specific user, client device, user cohort, or client device cohort will respond as desired (i.e., will conform to the target 440) based on a real-time data set collected for a most current period (e.g., the most current second, minute, day, or hour). Actual results may be measured and fed back 450 to the induction process 430, so that training is continual and the induction process 430 can evolve with changing conditions.

The function 400 may include a process 430, which includes machine learning and other computational elements, receiving as input personally identifiable log-level data 410 from client devices and personally identifiable application data 420 from client devices or web applications serving client devices or identified users. Further description of the input data 410, 420 is provided in connection with FIG. 3 above and FIG. 5 below. The multistage induction process 430 uses machine learning and programmed tools in stages, operating on the input data to map inputs to predictions that apply in one or more "real time" contexts. In the illustrated example, the prediction 440 concerns the propensity of an identified person or client to engage with a message in the real time context. Any other system-measurable target may be specified, in the alternative.

Real time messages via a system 100 include electronic transmission of message information to a client device or other terminal but may be delivered to the intended recipient ("target") non-electronically or electronically. For example, a human or robotic agent may receive the message electronically and acting as an intermediary deliver it to the intended end recipient verbally. The message may be, or may include, a direct commercial offer to complete a transaction of some kind, or a non-commercial offer to supply information, for example, an email address or survey response. The propensity to engage may be calculated for a particular message, or for a class of messages. Examples of the process 430 are described herein as relating to messaging to consumers of entertainment content but may be adapted for other types of messaging. The process 430 may calculate a numerical or ranked propensity for different messages or message types, or for a single message or message type. As used herein, "message type" refers to a class of messages defined by shared semantic qualities, for example, "offer" messages, "promotional messages" or "promotional messages for _____." In an alternative, the process 430 may select one or more messages or message types as optimal for use in the real time context. In addition, the process 430 may provide an output indicating that the real time context is not appropriate for any messaging, to enable any cooperating messaging system to wait for a better opportunity.

Figure 5:
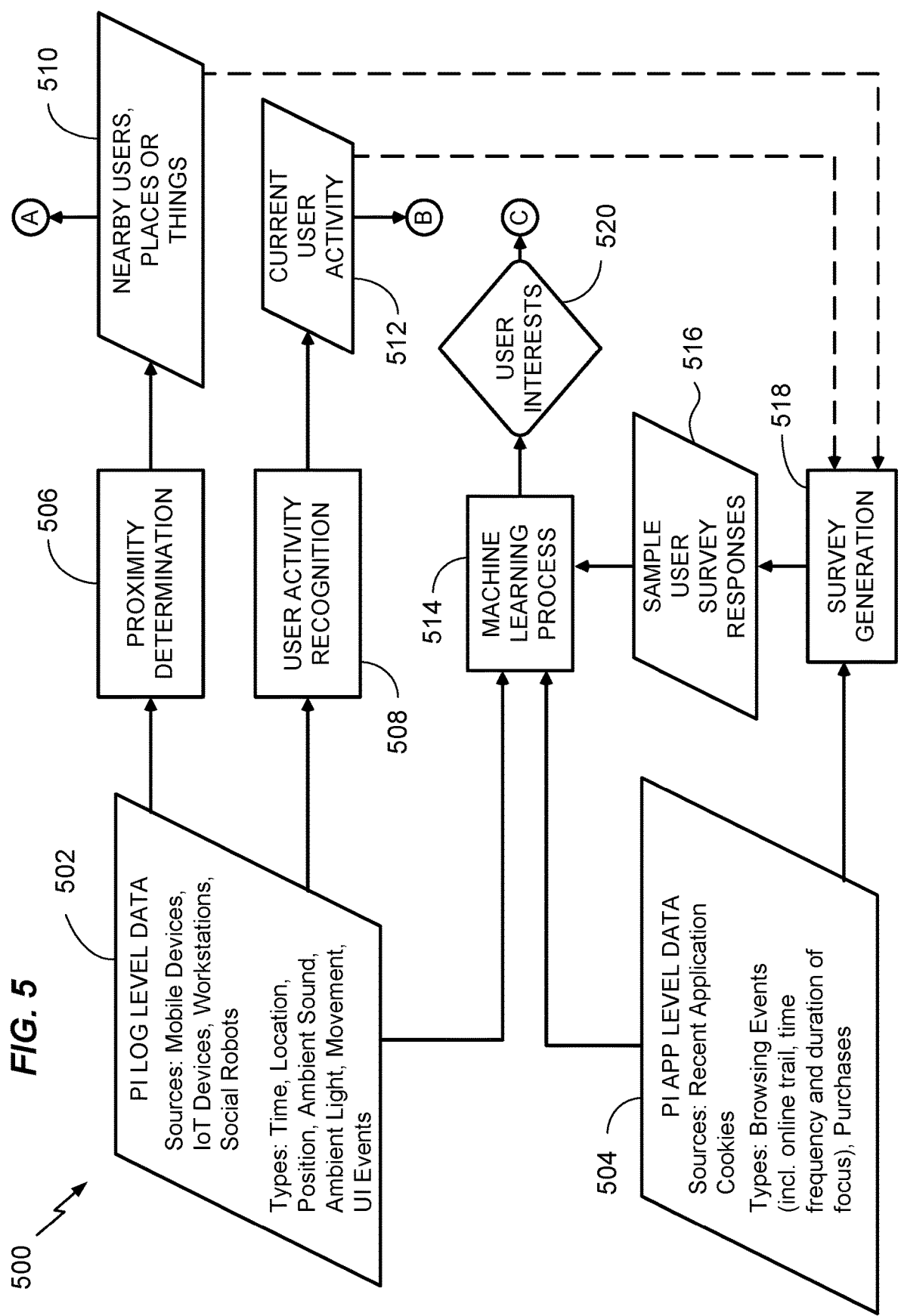
FIGS. 5-6 are block diagrams illustrating more detailed aspects of functional block 400 shown in FIG. 4.
Figure 6:
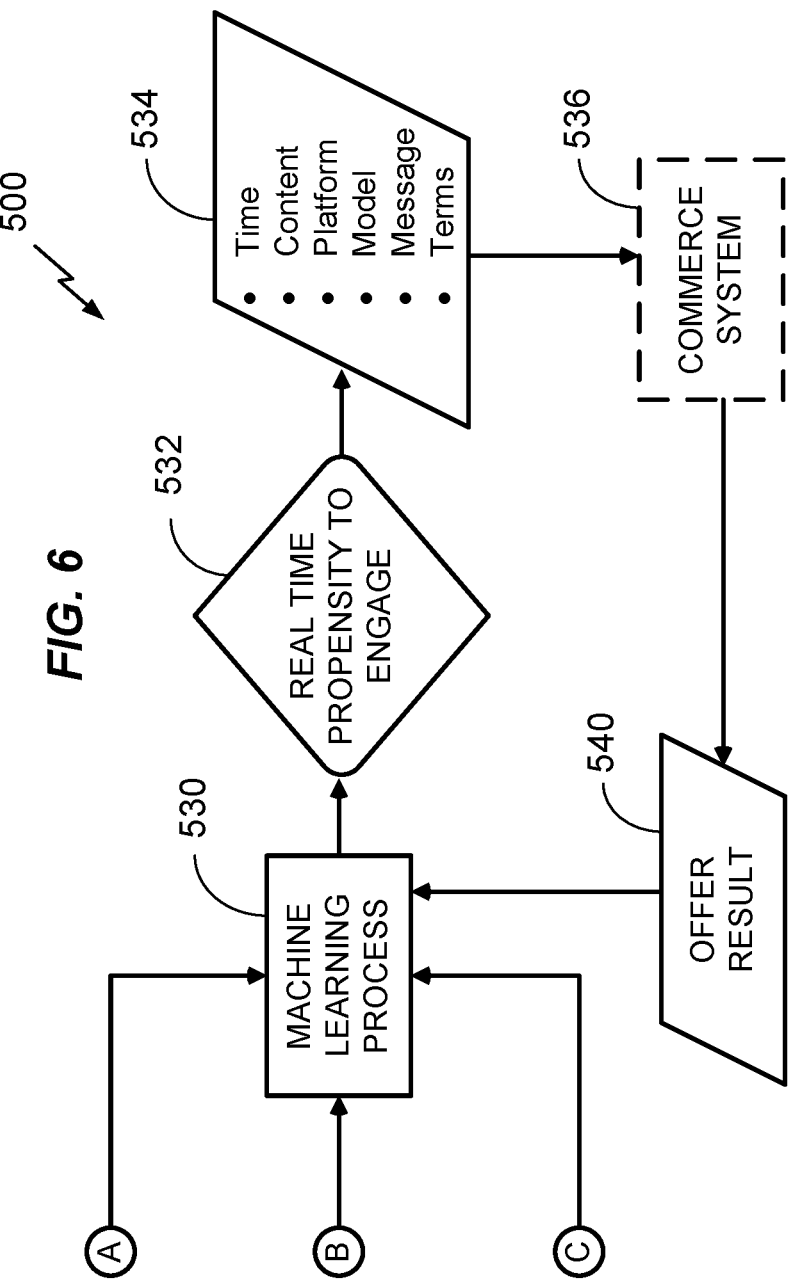

FIGS. 5-6 provide a view of a more detailed process or apparatus 500 variation of the multistage induction process 430 in the process or apparatus 400 shown in FIG. 4. The multistage induction process 430 spans both figures. Referring to FIG. 5, box 502 labeled "PI LOG LEVEL DATA," wherein "PI" stands for "personally identifiable," corresponds to box 410 in FIG. 4. "Log level" means the data is recorded by the client device as part of its normal data logging, for use by applications and system (e.g., cellular network) operators. "Personally identifiable" means that the logged data is associated with an identifier (e.g., name or identification number) for a person or household. For example, in a secure private device, the associated person is the one who passes the secure ID function of the device, such as by supplying a passcode, cryptographic key, or biometric personal identifier. In a public device (e.g., a kiosk or the point-of-sale terminal), the associated person may be automatically recognized from a biometric marker (e.g., by facial recognition), by supplying their identity via a user interface (verbal or written), or by a payment sources (e.g., debit or credit account) for a transaction. In either case, the log level data generated during the session is personally identifiable.

The PI log level data 502 may be provided from any terminal device or client device that interacts with an identified person, persons, or cohort of persons. Examples of sources include mobile smart phones and notepad computers, Internet of Things (IoT) appliances and devices, laptop computers and workstations, hands-free personal assistant devices, building or area security systems, and social robots. Whatever the source device, the log level data 502 is automatically generated by the source device during user interaction or at other times, reflecting a current machine state. The process or apparatus 500 may be designed to use available log level data, without requiring any source device to execute dedicated data acquisition code. For example, a cellular service data may provide log level data used for wireless communications, insofar as permitted by the end users. In an alternative, a data acquisition module (not shown) may cooperate with the process or apparatus 500 and supply dedicated code to source devices. Any suitable method for data collection may be used.

The PI log level data 502 may include information about various machine states. These states may include, for example, location coordinates, orientation of the device with respect to some reference (e.g., direction of gravity or compass direction), an ambient sound level, an ambient light level, acceleration and velocity, machine resource state or user interface (UI) events. UI events may include, for example, screen or keyboard touches, use of a verbal command, or other user interaction with a machine interface. It is not necessary that the log level data include the semantic content of the user action. In some cases, the mere fact that a user action or a type of user action occurred may be all that is available. A machine resource state may include, for example, extent of processor or memory resources, core temperatures, use of communication bandwidth, or other resource measurements. Each of the foregoing machine states may be associated with a timestamp indicating the time the state was measured and, if applicable, the duration (period) of the measurement.

Personally identifiable application ("app") level data 504 relates to user interactions with specific applications. Browsers are good sources of app level data, but other applications are also useful. For example, applications managing personal entertainment libraries are a good source of information for a user's interest in genres or titles of entertainment content. App level data may be obtained from "cookies," meaning records of application use left in the client's non-volatile memory or storage system to facilitate future sessions. App level data may also be obtained from the application itself, or from a server that interacts with the application. PI app level data 504 may include, for example, each user's online trail such as history of URL's visited, time, frequency and duration of visits to URL's; purchases or rentals of entertainment content or other products; frequency, time and duration of use of specific applications, or other information.

PI log level data 502 and PI app level data 504 may be used as sample data directly by the machine learning process 514 to derive predictive user interests 520. The machine learning process 514 may include, for example, an artificial neural network, a regression, instance-based learning process, a regularization, a decision tree, a Bayesian, a clustering, an association rule, a deep learning neural network, a dimensionality reduction, a support vector machine or an ensemble algorithm. Examples of libraries or developer kits for deep neural networks include, Theano, MXNet, or Tensor Flow. Xcboost is a gradient boosting framework. GBM is an acronym for Gradient Boosting Machine, a gradient boot technique developed by Jerome H. Friedman. Random Forests is a trademarked ensemble learning method developed by Leo Breiman and Adele Cutler. Support Vector Machines (SVMs) are a model for classification and regression analysis. These and other tools and techniques may be used for the machine learning process 514.

In addition, or in the alternative, programmed modules may be used to derive intermediate level data 510, 512 for use in the machine learning process 514 or 530 (FIG. 6). For example, an algorithmic proximity determination process 506 may be used to determine nearby users, places, or things. The process 506 may use an algorithm that retrieves persons, places or things from a database, calculates a distance from the user based on log level data 502, known location information, or both, and calculates a level of proximity to each person, place or thing. Proximity may be used as a substitute for activity, provided that the objects for which proximity is calculated reflect on the target's activities. For example, a person near a known office building or factory is likely to be working, while a person in a residential neighborhood or near family members is more likely to be enjoying leisure time. However, as more people work from home, more granular data may be needed to make a distinction between work and time off.

A second programmed module 508 may be useful to determine an estimate of a target's current activities. For example, a person reclining may be located in a particular location in the home associated with leisure time, such as a bedroom; or near an appliance associated with leisure, such as a smart Internet-connected home theater system. On the other hand, if the individual is in an area of the home used for working, such as a home office, or using a workstation or an application used for working, the process 508 may infer that the person is working. Machine learning may also be used to estimate a user activity based on the log level data 502.

In an aspect, the machine learning process 514 may be trained by comparing outputs to sample user survey responses 516 provided by a survey generation module 518. The intermediate proximity data 510 or intermediate activity data 512 may be used to inform the survey generation module 518 when to generate each survey request, and a type of survey (e.g., number of questions and content of questions) to ask. Survey questions may include questions about the target's interests, current activities, or demographic profile. As the machine learning process is trained, it will be better able to predict survey responses based on the log level data 502 and app level data 504 inputs, for any random person. Advantageously, use of the machine learning process avoids the need to have a value for every attribute that is tracked to obtain meaningful induction results. In addition, the machine learning process is capable of discovering data correlations that are not apparent to human observers or deterministic algorithms. Training of the machine learning process 514 should be continuous or performed at frequent intervals, because cultures, behaviors, and interests are not static and tend to evolve unpredictably over time. The process 514 derives user interest data 520, including chosen descriptors for interests relevant to the problem to be solved. For example, if the problem is to determine the type of entertainment content a user is most interested in, chosen descriptors may include content titles, genres, media, consumption mode (business model), favorite scenes or actors, or any other information that is descriptive of the user's preferences in entertainment content. The descriptors themselves are predetermined by the design of the machine learning process 514.

Referring to FIG. 6, a remaining portion of the process or apparatus 500 derives a real time propensity to engage 532 and more detailed constituents 534. User interest data 520 ('C' reference) is an intermediate data set, because it is not limited to any user's real time immediate interests at any point in time. User interest data is one input into the second machine learning process 530, with other inputs including nearby people, places or things 510 ('A' reference) and current user activity 512 ('B' reference). In an alternative, or in addition, the PI log level data 502 may be provided to the machine learning process 530. The process 530 may use the same or similar tools and techniques and the first machine learning process 514, adapted to solve a different problem, namely, the user's propensity to engage with a particular message at a particular time and context. For any given user, it may be desirable to solve for propensity 532 in different contexts, and to repeat the analysis process 532 and supplemental processes periodically to provide more appropriate solutions as the user's interests or habits change.

For solutions directed at messaging for entertainment content, message profile data 534 for the process or apparatus 500 may include a time-of-day, day-of-week, or user activity context when a message is likely to be more effective, and for various such contexts, one or more messages that are likely to result in a desired engagement with the target. Messages for entertainment content may include parameters such as the content title or genre, optimal platform for the message (e.g., mobile phone or smart TV), business model (e.g., purchase, subscription, rental or ad-supported), message content and format (e.g., video or graphic, most appealing scenes or actors), and business terms (e.g., price and discounts). The process 500, viewed at a high level, thus maps the log level data 502 and app level data 504 to a set of time-activity contexts each associated with messaging parameters likely to be most effective for a specific context. The resulting map can be provided to a commerce system 536 that uses it to manage consumer messaging, by recognizing applicable contexts, generating messaging consistent with the message profile data, managing transaction, and tracking consumer responses to the messaging. Feedback from the commerce system 536, such as offer results 540, may be provided to the machine learning process 530 to train or refine its accuracy over time.

Figure 7:
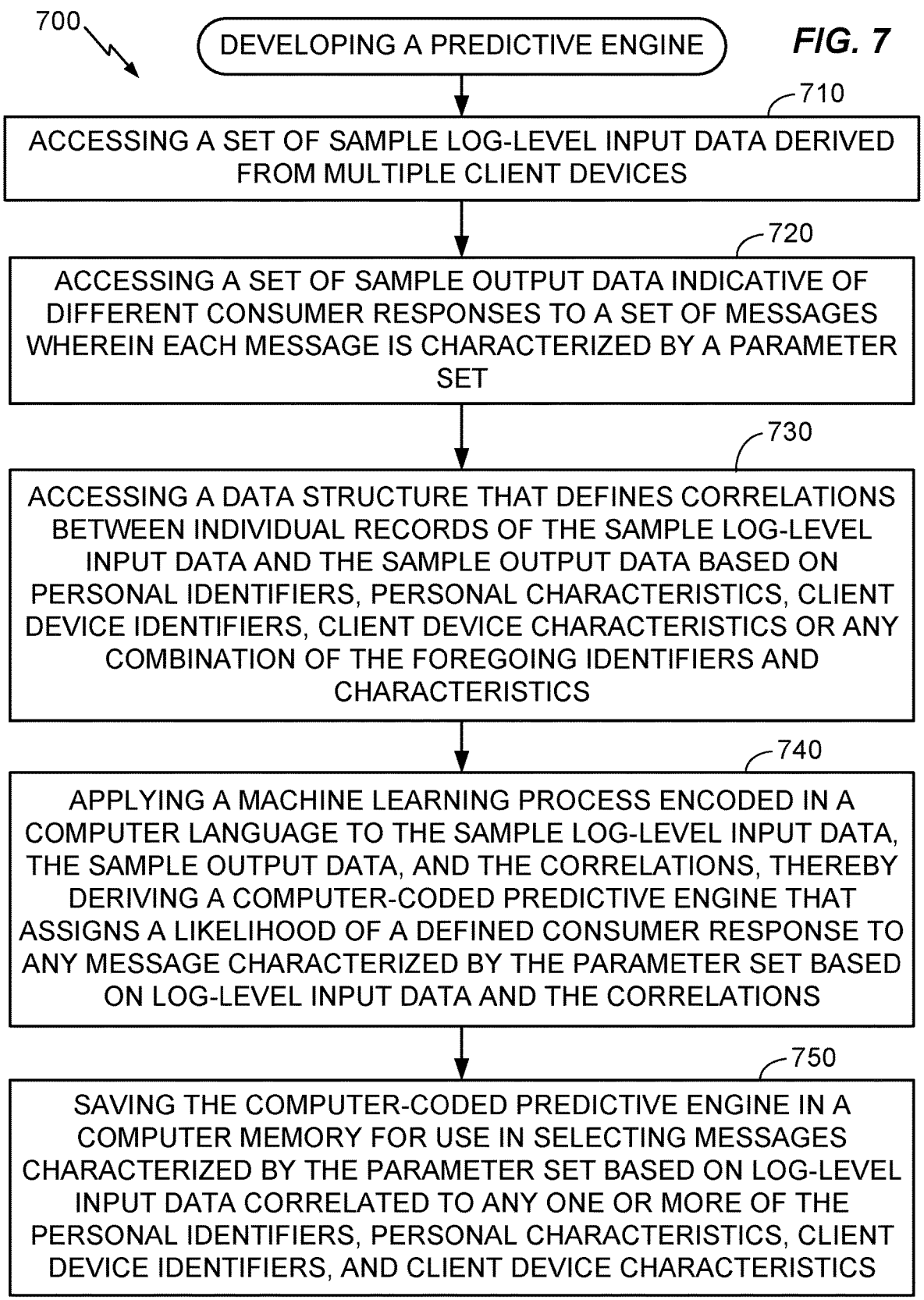
FIG. 7 is a flow chart illustrating a method for developing a predictive engine useful for automatic selection of electronic messages for delivery to client devices.

In view of the foregoing, and by way of additional example, FIG. 7 shows aspects of a method 700 for developing a predictive engine for use in automatic selection and timing of messages. The method 700 may be performed by one or more programmable computers for data processing. The method 700 may include, at 710, accessing, by one or more hardware processors, a set of sample log-level input data derived from multiple client devices. The sample log-level data may be collected in a data structure from multiple client devices. Accessing the set of log-level input data may include, for example, connecting to a database of the log-level data in a secure session, or reading a data file containing the log-level data from a computer-readable memory. The log-level may be time-correlated, for example, each data record may be time stamped.

The method 700 may include, at 720, accessing, by the one or more hardware processors, a set of sample output data indicative of different consumer responses to a set of messages wherein each message is characterized by a parameter set. The sample output data may be collected from one or more servers that record interactions with client devices, such as, for example, engagement with a message or other data object, or completion of a transaction. The sample output data may be time-correlated. The sample output data may be accessed in a manner similar to the sample input data.

The method 700 may include, at 730, accessing, by one or more hardware processors, a data structure that defines correlations between individual records of the sample log-level input data and the sample output data based on personal identifiers, personal characteristics, client device identifiers, client device characteristics or any combination of the foregoing identifiers and characteristics. A cohort may be identified by a common personal characteristic, or by falling within a range of personal characteristics. In an alternative, each data record of the sample input data and sample output data may already be associated with an identified user, client device, and/or user cohort, via one or more data objects such as, for example, personal identifiers, personal characteristics, client device identifiers, client device characteristics or any combination of the foregoing identifiers and characteristics, when first accessed by the hardware processor. In this alternative embodiment, the process 730 of accessing a data structure that defines the correlations may be subsumed by the processes 710 and 720 for accessing the sample data.

The method 700 may include, at 740, applying, by one or more hardware processors, a machine learning process encoded in a computer language to the sample log-level input data, the sample output data, and the correlations, thereby deriving a computer-coded predictive engine that assigns a likelihood of a defined consumer response to any message characterized by the parameter set based on log-level input data and the correlations. The machine learning process may be implemented by programming an algorithm selected from one or more of an artificial neural network, a regression, an instance-based learning process, a regularization, a decision tree, a Bayesian, a clustering, an association rule, a deep learning, a dimensionality reduction, or an ensemble algorithm. Further details of the learning process may be as described herein above, for example in connection with FIGS. 4-6. The method 700 may also be used to retrain an existing predictive engine.

The method 700 may include, at 750, saving, by one or more hardware processors, the computer-coded predictive engine in a computer memory for use in selecting messages characterized by the parameter set based on log-level input data correlated to any one or more of the personal identifiers, personal characteristics, client device identifiers, and client device characteristics. Application of the predictive engine is described in connection with FIGS. 9-10, and herein above.

In an aspect, the method 700 may further include selecting, by the one or more hardware processor, the sample log-level input data to include data from a data management platform that collects consumer responses to digital audio-video or audio entertainment content, whereby the predictive engine learns to predict influence of browsing and commenting history (which drive the input set) on responses to messages characterized by different values of the parameter set.

In some embodiments, the method 700 may further include selecting, by the one or more hardware processors, the sample output data to represent long-term user preferences, whereby the predictive engine learns to predict long-term user responses. A "long-term" preference means a preference that lasts longer than a defined time period relevant to the transaction environment of interest. The length of the defined time period may depend on dynamic characteristics of the environment that the preference arises. For example, in the market for large durable good or real property with high friction transactions, a "long-term" preference may be one that lasts for more than a year. For further example, in a market for entertainment content, a long-term preference may be one lasting longer than a week. In a very fast paced market, such as a highly liquid exchange or within a virtual game session, a long-term preference may be one that lasts longer than a day. Conversely, the method 700 may further include selecting, by the one or more hardware processors, the sample output data to represent short-term user preferences, whereby the predictive engine learns to predict short-term responses. Short-term user preferences are those that do not last longer than the defined time period; for example, a preference for entertainment while waiting for a ride or in waiting room. In contrast a longer-term preference for entertainment may include a preference for a movie the user would like to see sometime in the next few months.

Some types of log-level data may be more useful for predicting short-term preferences. For example, the method 700 may further include selecting, by the one or more hardware processors, the sample log-level input data to include data indicating body positions of targeted consumers, whereby the predictive engine learns to predict influence of body positions on short-term responses to messages characterized by different values of the parameter set. In another example, the method 700 may further include selecting, by the one or more hardware processors, the sample log-level input data to include data from an automatic content recognition engine, whereby the predictive engine learns to predict influence of consumer consumption of electronic content on short-term responses to messages characterized by different values of the parameter set. In another example, the method 700 may further include selecting, by the one or more hardware processors, the sample log-level input data to include data from retail point-of-sale records, whereby the predictive engine learns to predict influence of point-of-sale activity on short-term responses to messages characterized by different values of the parameter set. In another example, the method 700 may further include selecting, by the one or more hardware processors, the sample log-level input data to include terminal device activity levels, whereby the predictive engine learns to predict influence of device activity level on short-term responses to messages characterized by different values of the parameter set.

In some embodiments, the messages include delivery of digital entertainment content, and the method 700 may further include configuring, by the one or more hardware processors, the parameter set characterizing each message to include at least an indication of a content title, technical format, genre, business model, or distribution channel, whereby the predictive engine learns to predict influence of the sample log-level input data on responses to content offers characterized by different combinations of parameter set values. In some embodiments, an upstream data collection node includes newsfeed data in the sample input data, whereby the predictive engine learns to predict influence of newsfeed events on responses to messages characterized by different values of the parameter set.

Figure 8:
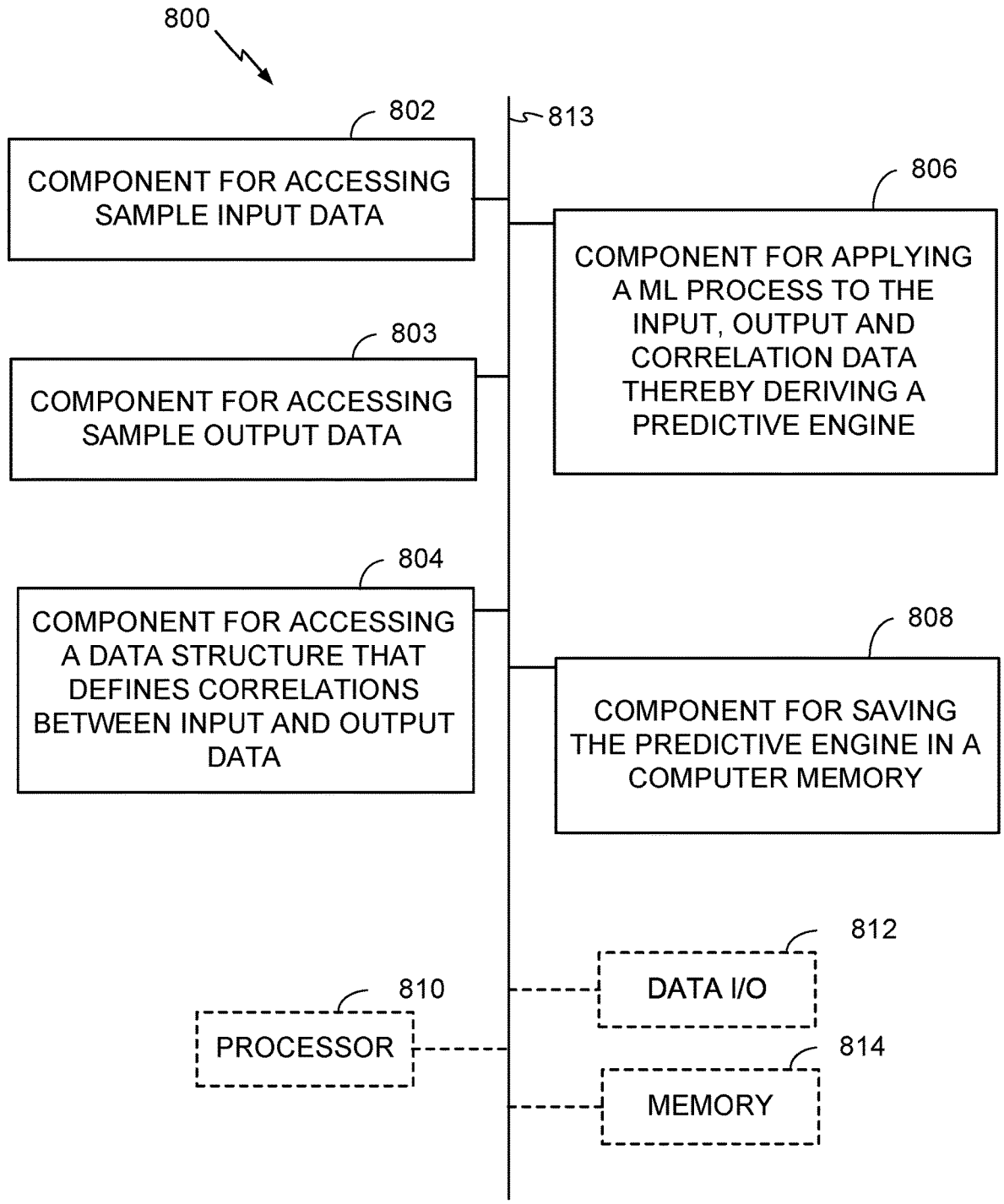
FIG. 8 is a conceptual block diagram illustrating components of an apparatus or system for performing a method as shown in FIG. 7.

FIG. 8 is a conceptual block diagram illustrating components of an apparatus or system 800 developing a predictive engine useful for automatic selection of electronic messages for delivery to client devices, as described herein. The apparatus or system 800 may include additional or more detailed components for performing functions or process operations as described herein. As depicted, the apparatus or system 800 may include functional blocks that can represent functions implemented by a processor, software, or combination thereof (e.g., firmware). The apparatus 800 may be a production computer, a game client, or a combination of the foregoing.

As illustrated in FIG. 8, the apparatus or system 800 may comprise an electrical component 802 for accessing a set of sample log-level input data derived from multiple client devices. The component 802 may be, or may include, a means for said accessing. Said means may include the processor 810 coupled to the memory 814, and to a data input/output interface 812, the processor executing an algorithm based on program instructions stored in the memory. Such algorithm may include a sequence of more detailed operations, for example, requesting access to the log-level input data, receiving a pointer to a first record of a data structure containing the sample input data, and querying the data structure in a sequential order, or reading a data file in a sequential order. In an alternative, accessing may include initiating a streaming session with a data source, requesting the log-level data in a data stream, and receiving the sample data in a streaming session.

The apparatus 800 may further include an electrical component 803 for accessing a set of sample output data indicative of different consumer responses to a set of messages wherein each message is characterized by a parameter set. The component 803 may be, or may include, a means for said accessing the sample output data. Said means may include the processor 810 coupled to the memory 814, the processor executing an algorithm based on program instructions stored in the memory. Such algorithm may include a sequence of more detailed operations, for example, requesting access to the sample output data, receiving a pointer to a first record of a data structure containing the sample output data, and querying the data structure in a sequential order, or reading a data file in a sequential order. In an alternative, accessing may include initiating a streaming session with a data source, requesting the sample output data in a data stream, and receiving the sample data in a streaming session.

The apparatus 800 may further include an electrical component 804 for accessing a data structure that defines correlations between individual records of the sample log-level input data and the sample output data based on personal identifiers, personal characteristics, client device identifiers, client device characteristics or any combination of the foregoing identifiers and characteristics. The component 804 may be, or may include, a means for said accessing the correlations. Said means may include the processor 810 coupled to the memory 814, the processor executing an algorithm based on program instructions stored in the memory. Such algorithm may include a sequence of more detailed operations, for example, requesting access to the correlation data, receiving a pointer to a first record of a data structure containing the correlation data, and querying the data structure in a sequential order, or reading a data file in a sequential order. In an alternative, accessing may include initiating a streaming session with a data source, requesting the correlation data in a data stream, and receiving the correlation data in a streaming session.

The apparatus 800 may further include an electrical component 806 for applying a machine learning process encoded in a computer language to the sample log-level input data, the sample output data, and the correlations, thereby deriving a computer-coded predictive engine that assigns a likelihood of a defined consumer response to any message characterized by the parameter set based on log-level input data and the correlations. The component 806 may be, or may include, a means for said applying. Said means may include the processor 810 coupled to the memory 814, the processor executing an algorithm based on program instructions stored in the memory. Such algorithm may include a sequence of more detailed operations, for example, executing a machine learning process selected from one or more of an artificial neural network, a regression, an instance-based learning process, a regularization, a decision tree, a Bayesian, a clustering, an association rule, a deep learning, a dimensionality reduction, or an ensemble algorithm, configuring the selected process with the sample input, output and correlation data, grouping the sample data based on the correlation data, providing feedback indicative of a difference between machine-predicted output and actual output, and stopping the machine learning process once the difference falls below a threshold. Further details may be as described herein above in connection with FIGS. 4-6.

The apparatus 800 may further include an electrical component 808 for saving the computer-coded predictive engine in a computer memory for use in selecting messages characterized by the parameter set based on log-level input data correlated to any one or more of the personal identifiers, personal characteristics, client device identifiers, and client device characteristics. The component 808 may be, or may include, a means for said saving. Said means may include the processor 810 coupled to the memory 814, the processor executing an algorithm based on program instructions stored in the memory. Such algorithm may include a sequence of more detailed operations, for example, writing the predictive engine to a computer memory.

The apparatus 800 may optionally include a processor module 810 having at least one processor. The processor 810 may be in operative communication with the modules 802-808 via a bus 813 or similar communication coupling. The processor 810 may effect initiation and scheduling of the processes or functions performed by electrical components 802-808.

In related aspects, the apparatus 800 may include a data interface module 812 operable for communicating with system components over a computer network. A data interface module may be, or may include, for example, an Ethernet port or serial port (e.g., a Universal Serial Bus (USB) port). In further related aspects, the apparatus 800 may optionally include a module for storing information, such as, for example, a memory device 814. The computer readable medium or the memory module 814 may be operatively coupled to the other components of the apparatus 800 via the bus 813 or the like. The memory module 814 may be adapted to store computer readable instructions and data for effecting the processes and behavior of the modules 802-808, and subcomponents thereof, or the processor 810, or the method 700. The memory module 814 may retain instructions for executing functions associated with the modules 802-808. While shown as being external to the memory 814, it is to be understood that the modules 802-808 can exist within the memory 814.

The apparatus 800 may include a transceiver configured as a wireless transmitter/receiver, or a wired transmitter/receiver, for transmitting and receiving a communication signal to/from another system component. In alternative embodiments, the processor 810 may include networked microprocessors from devices operating over a computer network.

Figure 9:
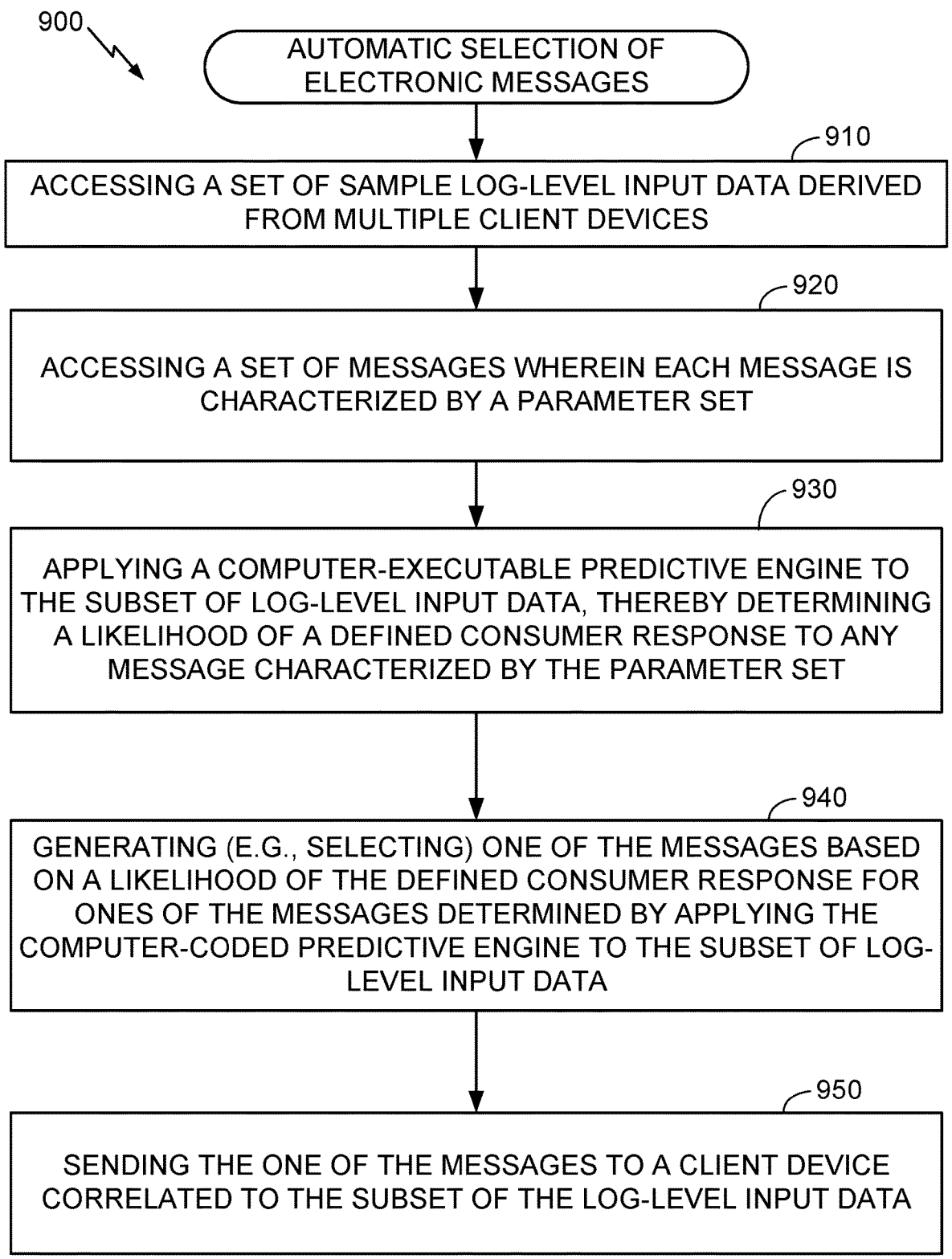
FIG. 9 is a flow chart illustrating a method for automatic selection of electronic messages for delivery to client devices.

As noted above, a saved predictive engine can be used for message selection, with or without undergoing periodic retraining. FIG. 9 shows aspects of a method 900 for automatic selection of electronic messages for delivery to client devices. The method 900 may be performed by one or more programmable computers for data processing. The method 900 may include, at 910, accessing, by one or more hardware processors, a subset of log-level input data derived from multiple client devices, wherein the subset is defined by at least one correlation to one or more of a personal identifier, a personal characteristic, a client device identifier, and a client device characteristic. The scope of the input data may be selected to match the scope of sample input data used for training the predictive engine.

The method 900 may further include, at 920, accessing, by the one or more hardware processors, a set of messages wherein each message is characterized by a parameter set. Parameters in the parameter set may include, for example, a content title, technical format, genre, business model, or distribution channel for digital entertainment content, wherein the parameters are within the scope of the sample input data. For example, if the parameters include a content title, so should have the sample input set. The method 900 may further include, at 930, applying, by the one or more hardware processors, a computer-executable predictive engine to the subset of log-level input data, thereby determining a likelihood of a defined consumer response to any message characterized by the parameter set. The predictive engine may implement an algorithm selected from one or more of an artificial neural network, a regression, an instance-based learning process, a regularization, a decision tree, a Bayesian, a clustering, an association rule, a deep learning neural network, a dimensionality reduction, or an ensemble algorithm.

The method 900 may further include, at 940 selecting, by the one or more hardware processors, one of the messages based on the likelihood of the defined consumer response for ones of the messages. The consumer response may be estimated for a single identified user, or for a cohort of identified users, or for a cohort of non-personally identified users. For example, females ages 20-25 living in Baltimore are an example of a cohort. For a message to be delivered to that cohort, the one or more hardware processors may select a message most likely to generate engagement by people in the cohort. The method 900 may further include, at 950, sending, by the one or more hardware processors, the selected one of the messages to a client device correlated to the subset of the log-level input data. The processor may determine that the client device is in use by the identified user or a member of the targeted cohort, before sending the message.

In further aspects of the method 900, the predictive engine is trained to predict influence of browsing and commenting history on responses to messages characterized by different values of the parameter set, and selecting one of the messages is based at least in part on a browsing or commenting history of a person or device identified by one or more of the personal identifier, the personal characteristic, the client device identifier, and the client device characteristic.

In other aspects of the method 900, the predictive engine is trained to predict long-term responses, and selecting one of the messages may include selecting a message associated with a relatively high probability of a positive long-term response. In an alternative, or in addition, the predictive engine is trained to predict short-term responses, and selecting one of the messages may include selecting a message associated with a relatively high probability of a positive short-term response. For example, the predictive engine may be trained to predict influence of data indicating body positions of targeted consumers on responses to messages characterized by different values of the parameter set, and selecting one of the messages is based at least in part on data indicating a current body position of a person identified by one or more of the personal identifier, the personal characteristic, the client device identifier, and the client device characteristic.

For further example, the predictive engine is trained to predict influence of data from an automatic content recognition engine on responses to messages characterized by different values of the parameter set, and selecting one of the messages is based at least in part on data indicating consumer consumption of electronic content of a person or device identified by one or more of the personal identifier, the personal characteristic, the client device identifier, and the client device characteristic.

In another embodiment of the method 900, the predictive engine is trained to predict influence of data from retail point-of-sale records on responses to messages characterized by different values of the parameter set, and selecting one of the messages is based at least in part on data indicating point-of-sale activity of a person or device identified by one or more of the personal identifier, the personal characteristic, the client device identifier, and the client device characteristic. For another example, the predictive engine is trained to predict influence of terminal device activity levels on responses to messages characterized by different values of the parameter set, and selecting one of the messages is based at least in part on data indicating device activity level of a person or device identified by one or more of the personal identifier, the personal characteristic, the client device identifier, and the client device characteristic.

In an aspect of the method 900, the messages include delivery of digital entertainment content characterized by the parameter set including a content title, technical format, genre, business model, or distribution channel, and selecting one of the messages is based at least in part on influence of the sample log-level input data on responses to content offers characterized by different combinations of the parameter values.

In another aspect, the method 900 may include accessing newsfeed data, and selecting one of the messages is based at least in part on the newsfeed data and location of a person or device identified by one or more of the personal identifier, the personal characteristic, the client device identifier, and the client device characteristic.

Figure 10:
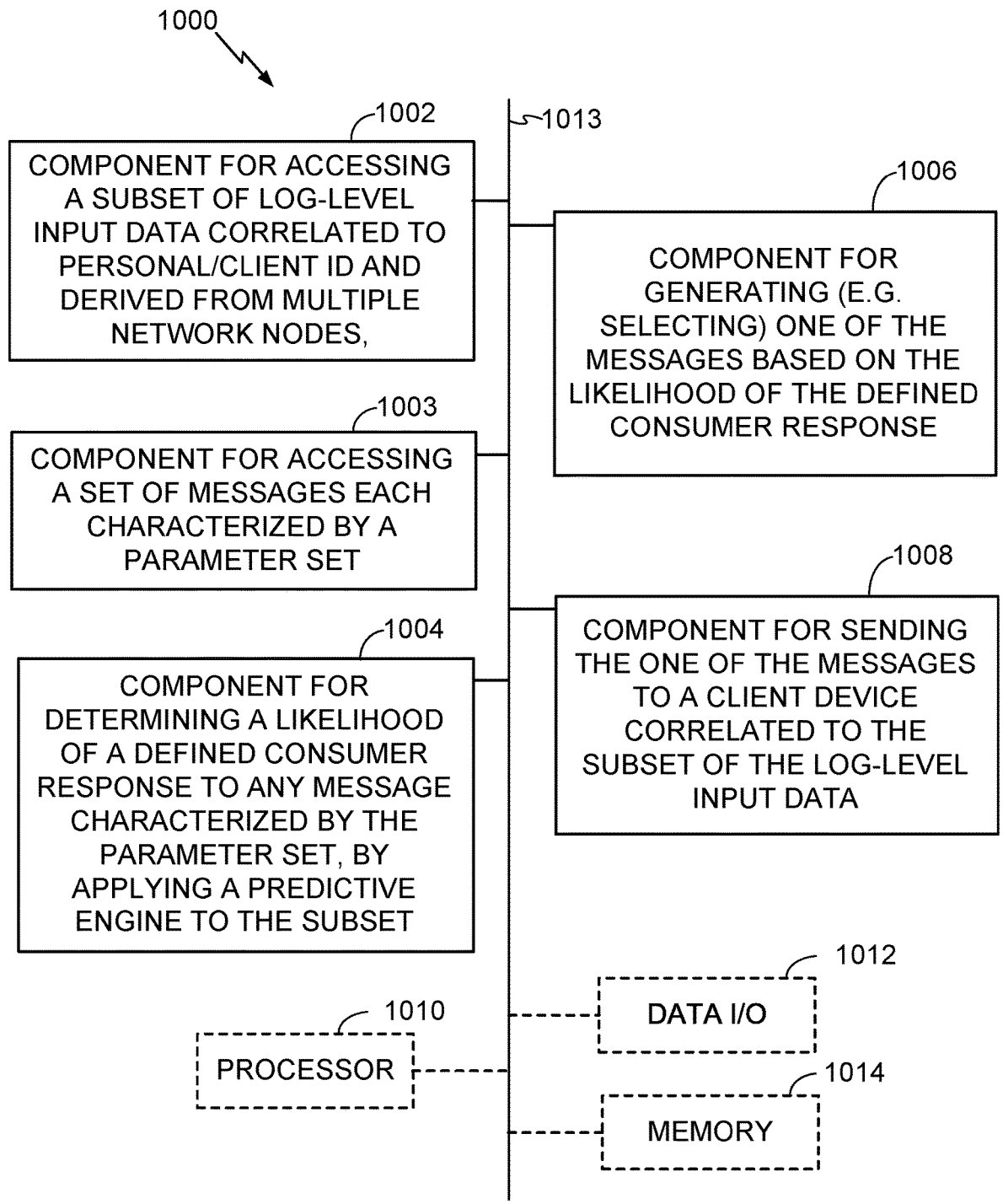
FIG. 10 is a conceptual block diagram illustrating components of an apparatus or system for performing a method as shown in FIG. 9.

FIG. 10 is a conceptual block diagram illustrating components of an apparatus or system 1000 for automatic selection of electronic messages for delivery to client devices, as described herein. The apparatus or system 1000 may include additional or more detailed components for performing functions or process operations as described herein. As depicted, the apparatus or system 1000 may include functional blocks that can represent functions implemented by a processor, software, or combination thereof (e.g., firmware). The apparatus 1000 may be a data processing server, or combination of servers.

As illustrated in FIG. 10, the apparatus or system 1000 may comprise an electrical component 1002 for accessing a subset of log-level input data derived from multiple client devices, wherein the subset is defined by at least one correlation to one or more of a personal identifier, a personal characteristic, a client device identifier, and a client device characteristic. The component 1002 may be, or may include, a means for said accessing. Said means may include the processor 1010 coupled to the memory 1014, and to a data input/output interface 1012, the processor executing an algorithm based on program instructions stored in the memory. Such algorithm may include a sequence of more detailed operations, for example, receiving selecting parameters defining the data subset, accessing a data structure containing the log-level input data, and filtering the log-level input data based on the parameters.

The apparatus 1000 may further include an electrical component 1003 for accessing a set of messages wherein each message is characterized by a parameter set. The component 1003 may be, or may include, a means for said accessing the message set. Said means may include the processor 1010 coupled to the memory 1014, the processor executing an algorithm based on program instructions stored in the memory. Such algorithm may include a sequence of more detailed operations, for example, requesting access to the message set, receiving a pointer to a first record of a data structure containing the message set, and querying the data structure in a sequential order, or reading a data file in a sequential order. In an alternative, accessing may include initiating a streaming session with a data source, requesting the message set in a data stream, and receiving the message set in a streaming session.

The apparatus 1000 may further include an electrical component 1004 for applying a computer-executable predictive engine to the subset of log-level input data, thereby determining a likelihood of a defined consumer response to any message characterized by the parameter set. The component 1004 may be, or may include, a means for said applying. Said means may include the processor 1010 coupled to the memory 1014, the processor executing an algorithm based on program instructions stored in the memory. Such algorithm may include a sequence of more detailed operations, for example, implementing an algorithm selected from one or more of an artificial neural network, a regression, an instance-based learning process, a regularization, a decision tree, a Bayesian, a clustering, an association rule, a deep learning neural network, a dimensionality reduction, or an ensemble algorithm, providing message parameters in the input set, and outputted a predicted response likelihood. The algorithm may further include more specific likelihood-determining operations as described above in connection with FIG. 9, or elsewhere herein above.

The apparatus 1000 may further include an electrical component 1006 for selecting, by the one or more hardware processors, one of the messages based on the likelihood of the defined consumer response for ones of the messages. The component 1006 may be, or may include, a means for said selecting. Said means may include the processor 1010 coupled to the memory 1014, the processor executing an algorithm based on program instructions stored in the memory. Such algorithm may include a sequence of more detailed operations, for example, ranking predicted responses computed for each message, and selecting a highest ranking message, wherein the ranking ranks highest the message most likely to cause the targeted result to be achieved.

The apparatus 1000 may further include an electrical component 1008 for sending, by the one or more hardware processors, the selected one of the messages to a client device correlated to the subset of the log-level input data. The component 1008 may be, or may include, a means for said sending. Said means may include the processor 1010 coupled to the memory 1014, the processor executing an algorithm based on program instructions stored in the memory. Such algorithm may include a sequence of more detailed operations, for example, selecting a message delivery medium, formatting the massage for the selected medium, and transmitting the message according to the selected medium's message protocol.

The apparatus 1000 may optionally include a processor module 1010 having at least one processor. The processor 1010 may be in operative communication with the modules 1002-1008 via a bus 1013 or similar communication coupling. The processor 1010 may effect initiation and scheduling of the processes or functions performed by electrical components 1002-1008.

In related aspects, the apparatus 1000 may include a data interface module 1012 operable for communicating with system components over a computer network. A data interface module may be, or may include, for example, an Ethernet port or serial port (e.g., a Universal Serial Bus (USB) port). In further related aspects, the apparatus 1000 may optionally include a module for storing information, such as, for example, a memory device 1014. The computer readable medium or the memory module 1014 may be operatively coupled to the other components of the apparatus 1000 via the bus 1013 or the like. The memory module 1014 may be adapted to store computer readable instructions and data for effecting the processes and behavior of the modules 1002-1008, and subcomponents thereof, or the processor 1010, or the method 900. The memory module 1014 may retain instructions for executing functions associated with the modules 1002-1008. While shown as being external to the memory 1014, it is to be understood that the modules 1002-1008 can exist within the memory 1014.

The apparatus 1000 may include a transceiver configured as a wireless transmitter/receiver, or a wired transmitter/receiver, for transmitting and receiving a communication signal to/from another system component. In alternative embodiments, the processor 1010 may include networked microprocessors from devices operating over a computer network.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

As used herein, "virtual reality" is applied to content, applications or hardware that immerses a user in a virtual three-dimensional (3D) world, including, for example, various video game content, and animated film content. "Augmented reality" is applied content, applications or hardware that insert virtual objects into a user's perception of their physical environment. The term "mixed reality" includes both virtual reality and augmented reality. Virtual reality (VR) and augmented reality (AR) have been applied to various types of immersive video stereoscopic presentation techniques including, for example, stereoscopic virtual reality headsets. Headsets and other presentation methods immerse the user in a 3D scene. Lenses in the headset enable the user to focus on a lightweight split display screen mounted in the headset only inches from the user's eyes. Different sides of the split display show right and left stereoscopic views of video content, while the user's peripheral view is blocked. In another type of headset, two separate displays are used to show different images to the user's left eye and right eye respectively. In another type of headset, the field of view of the display encompasses the full field of view of eye including the peripheral view. In another type of headset, an image is projected on the user's retina using controllable small lasers, mirrors or lenses. Either way, the headset enables the user to experience the displayed virtual reality content more as if the viewer were immersed in a real scene, with or without also conveying the viewer's local environment.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, digital versatile disk (DVD), Blu-ray™, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a client device or server. In the alternative, the processor and the storage medium may reside as discrete components in a client device or server.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips, or other format), optical disks (e.g., compact disk (CD), DVD, Blu-ray™ or other format), smart cards, and flash memory devices (e.g., card, stick, or other format). Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method for developing a predictive engine useful for automatic selection of electronic messages for delivery to client devices, the method comprising:

accessing, by one or more hardware processors, a set of sample log-level input data derived from multiple client devices, wherein the sample log-level input data is collected by a background not user-facing application operating on client devices, and is time-correlated data indicating a machine state or action for respective ones of the client devices constituting a sample for input to a machine learning process;

accessing, by the one or more hardware processors, a set of sample output data indicative of different consumer responses to a set of messages wherein each message is characterized by a parameter set;

accessing, by one or more hardware processors, a data structure that defines correlations between individual records of the sample log-level input data and the sample output data based on personal identifiers, personal characteristics, client device identifiers, client device characteristics or any combination of the foregoing identifiers and characteristics;

applying, by one or more hardware processors, the machine learning process encoded in a computer language to the sample log-level input data, the sample output data, and the correlations, thereby deriving a computer-coded predictive engine that assigns a likelihood of a defined consumer response to any message characterized by the parameter set based on log-level input data and the correlations; and saving, by one or more hardware processors, the computer-coded predictive engine in a computer memory for use in selecting messages characterized by the parameter set based on log-level input data correlated to any one or more of the personal identifiers, personal characteristics, client device identifiers, and client device characteristics.

2. An apparatus for developing a predictive engine useful for automatic selection of electronic messages for delivery to client devices, comprising:

at least one hardware processor coupled to a memory and to a network interface, wherein the memory holds instructions that when executed by the at least one hardware processor, cause the apparatus to perform:

accessing a set of sample log-level input data derived from multiple client devices, wherein the sample log-level input data is collected by a background not user-facing application operating on client devices, and is time-correlated data indicating a machine state or action for respective ones of the client devices constituting a sample for input to a machine learning process;

accessing a set of sample output data indicative of different consumer responses to a set of messages wherein each message is characterized by a parameter set;

accessing a data structure that defines correlations between individual records of the sample log-level input data and the sample output data based on personal identifiers, personal characteristics, client device identifiers, client device characteristics or any combination of the foregoing identifiers and characteristics;

applying a machine learning process encoded in a computer language to the sample log-level input data, the sample output data, and the correlations, thereby deriving a computer-coded predictive engine that assigns a likelihood of a defined consumer response to any message characterized by the parameter set based on log-level input data and the correlations; and saving the computer-coded predictive engine in a computer memory for use in selecting messages characterized by the parameter set based on log-level input data correlated to any one or more of the personal identifiers, personal characteristics, client device identifiers, and client device characteristics.

3. The apparatus of claim 2, wherein the memory holds further instructions for selecting the sample log-level input data to include data from a data management platform that collects consumer responses to digital audio-video or audio entertainment content, whereby the predictive engine learns to predict influence of browsing and commenting history on responses to messages characterized by different values of the parameter set.

4. The apparatus of claim 2, wherein the memory holds further instructions for selecting the sample log-level input data to include data indicating body positions of targeted consumers, whereby the predictive engine learns to predict influence of body positions on short-term responses to messages characterized by different values of the parameter set.

5. The apparatus of claim 2, wherein the memory holds further instructions for selecting the sample log-level input data to include data from an automatic content recognition engine, whereby the predictive engine learns to predict influence of consumer consumption of electronic content on short-term responses to messages characterized by different values of the parameter set.

6. The apparatus of claim 2, wherein the memory holds further instructions for selecting the sample log-level input data to include data from retail point-of-sale records, whereby the predictive engine learns to predict influence of point-of-sale activity on short-term responses to messages characterized by different values of the parameter set.

7. The apparatus of claim 2, wherein the memory holds further instructions for selecting the sample log-level input data to include terminal device activity levels, whereby the predictive engine learns to predict influence of device activity level on short-term responses to messages characterized by different values of the parameter set.

8. The apparatus of claim 2, wherein the memory holds further instructions for accessing the messages for delivery of digital entertainment content, and configuring the parameter set characterizing each message to include at least an indication of a content title, technical format, genre, business model, or distribution channel, whereby the predictive engine learns to predict influence of the sample log-level input data on responses to content offers characterized by different combinations of parameter set values.

9. The apparatus of claim 2, wherein the memory holds further instructions for including newsfeed data in the sample input data, whereby the predictive engine learns to predict influence of newsfeed events on responses to messages characterized by different values of the parameter set.

10. The apparatus of claim 2, wherein the memory holds further instructions for implementing the machine learning process at least in part by training an algorithm selected from one or more of an artificial neural network, a regression, an instance-based learning process, a regularization, a decision tree, a Bayesian, a clustering, an association rule, a deep learning, a dimensionality reduction, or an ensemble algorithm.

11. An apparatus for automatic selection of electronic messages for delivery to client devices, comprising:

at least one hardware processor coupled to a memory and to a network interface, wherein the memory holds instructions that when executed by the at least one hardware processor, cause the apparatus to perform:

accessing a subset of log-level input data derived from multiple client devices, wherein the subset is defined by at least one correlation of the log-level input data to one or more of a personal identifier, a personal characteristic, a client device identifier, and a client device characteristic, and the log-level input data is collected by a background not user-facing application operating on the multiple client devices, and is time-correlated data indicating a machine state or action for respective ones of the multiple client devices;

accessing a set of messages wherein each message is characterized by a parameter set;

applying a computer-executable predictive engine to the subset of log-level input data, thereby determining a likelihood of a defined consumer response to any message characterized by the parameter set, wherein the computer-executable predictive engine is derived by a machine learning process encoded in a computer language to a first set of sample log-level input data, a second set of sample output data, and a data structure that defines correlations between individual records of the first set of sample log-level input data and the second set of sample output data based on personal identifiers, personal characteristics, client device identifiers, client device characteristics or any combination of the foregoing identifiers and characteristics, thereby deriving the computer-coded predictive engine configured to assign a likelihood of a defined consumer response to the any message characterized by the parameter set based on the log-level input data and the correlations;

selecting one of the messages based on the likelihood of the defined consumer response for ones of the messages; and sending the selected one of the messages to a client device correlated to the subset of the log-level input data.

12. The apparatus of claim 11, wherein the memory holds further instructions for the selecting one of the messages based on probability of a positive long-term response.

13. The apparatus of claim 11, wherein the memory holds further instructions for selecting one of the messages based at least in part on a browsing or commenting history of a person or device identified by one or more of the personal identifier, the personal characteristic, the client device identifier, and the client device characteristic.

14. The apparatus of claim 11, wherein the memory holds further instructions for the selecting one of the messages based on a probability of a positive short-term response.

15. The apparatus of claim 11, wherein the memory holds further instructions for selecting one of the messages based at least in part on data indicating a current body position of a person identified by one or more of the personal identifier, the personal characteristic, the client device identifier, and the client device characteristic.

16. The apparatus of claim 11, wherein the memory holds further instructions for selecting one of the messages based at least in part on data indicating consumer consumption of electronic content of a person or device identified by one or more of the personal identifier, the personal characteristic, the client device identifier, and the client device characteristic.

17. The apparatus of claim 11, wherein the memory holds further instructions for selecting one of the messages based at least in part on data indicating point-of-sale activity of a person or device identified by one or more of the personal identifier, the personal characteristic, the client device identifier, and the client device characteristic.

18. The apparatus of claim 11, wherein the memory holds further instructions for selecting one of the messages based at least in part on data indicating device activity level of a person or device identified by one or more of the personal identifier, the personal characteristic, the client device identifier, and the client device characteristic.

19. The apparatus of claim 11, wherein the memory holds further instructions for selecting one of the messages based at least in part on influence of the log-level input data on responses to content offers characterized by different combinations of parameter values including one or more of content title, technical format, genre, business model, or distribution channel.

20. The apparatus of claim 11, wherein the memory holds further instructions for accessing newsfeed data, and for selecting one of the messages based at least in part on the newsfeed data and location of a person or device identified by one or more of the personal identifier, the personal characteristic, the client device identifier, and the client device characteristic.

21. The apparatus of claim 11, wherein the memory holds further instructions for implementing the computer-executable predictive engine at least in part by an algorithm selected from one or more of an artificial neural network, a regression, an instance-based learning process, a regularization, a decision tree, a Bayesian, a clustering, an association rule, a deep learning neural network, a dimensionality reduction, or an ensemble algorithm.

* * * * *